(12) United States Patent
Svrcek et al.

(10) Patent No.: US 10,465,795 B2
(45) Date of Patent: Nov. 5, 2019

(54) PISTON-INTEGRATED GAP COVER

(71) Applicant: EtaGen, Inc., Menlo Park, CA (US)

(72) Inventors: Matt Svrcek, Redwood City, CA (US); David Degraaff, Mountain View, CA (US)

(73) Assignee: EtaGen, Inc., Menlo Park, CA (US)

( * ) Notice: Subject to any disclaimer, the term of this patent is extended or adjusted under 35 U.S.C. 154(b) by 0 days.

(21) Appl. No.: 16/060,000

(22) Filed: Aug. 9, 2018

(65) Prior Publication Data

US 2019/0049008 A1 Feb. 14, 2019

Related U.S. Application Data

(60) Provisional application No. 62/543,296, filed on Aug. 9, 2017.

(51) Int. Cl.
| | |
|---|---|
| *F16J 9/16* | (2006.01) |
| *F16J 15/34* | (2006.01) |
| *F02F 5/00* | (2006.01) |
| *F16J 1/00* | (2006.01) |
| *F02F 3/00* | (2006.01) |

(52) U.S. Cl.
CPC ............... *F16J 9/16* (2013.01); *F02F 5/00* (2013.01); *F16J 1/005* (2013.01); *F16J 1/006* (2013.01); *F16J 1/008* (2013.01); *F16J 15/3488* (2013.01); *F02F 3/003* (2013.01)

(58) Field of Classification Search
CPC .. F16J 9/16; F16J 15/3488; F16J 1/005; F16J 1/006; F16J 1/008; F02F 5/00; F02F 3/003
USPC .......................................................... 277/434
See application file for complete search history.

(56) References Cited

U.S. PATENT DOCUMENTS

| | | | |
|---|---|---|---|
| 920,950 A * | 5/1909 | Harkins | .......... F16J 9/063 |
| | | | 277/469 |
| 1,970,892 A | 8/1934 | Kim et al. | |
| 4,185,842 A | 1/1980 | Magara | |
| 4,455,974 A | 6/1984 | Shapiro et al. | |
| 6,322,080 B1 | 11/2001 | Feistel | |
| 6,378,872 B1 * | 4/2002 | Moriarty | .......... F16J 9/16 |
| | | | 277/310 |
| 6,457,722 B1 | 10/2002 | Feistel | |
| 8,807,571 B2 | 8/2014 | Chalk et al. | |

(Continued)

FOREIGN PATENT DOCUMENTS

| | | |
|---|---|---|
| CH | 95881 | 8/1922 |
| GB | 190429560 | 3/1905 |

OTHER PUBLICATIONS

International Search Report and Written Opinion dated Nov. 15, 2018 for Application No. PCT/US2018/046140.

*Primary Examiner* — Nathan Cumar
(74) *Attorney, Agent, or Firm* — Haley Guiliano LLP (57) ABSTRACT

The present disclosure provides a sealing ring assembly with one or more piston-integrated gap cover features, configured to seal a high-pressure region from a relatively lower pressure region of a piston and cylinder device. The sealing ring assembly may include two rings which each may include one or more ring segments. The one or more gap-cover features, which may be in the form of protrusions in the piston ring groove, may engage with corresponding flat sections of the ring segments. As the sealing ring wears, the gap-cover features may stay engaged with the ring segments, thereby maintaining a seal.

30 Claims, 7 Drawing Sheets

(56) References Cited

U.S. PATENT DOCUMENTS

2003/0006562 A1\* 1/2003 Feistel ........................ F16J 9/02
  277/434
2015/0061230 A1\* 3/2015 Mina ........................ B25C 1/047
  277/434

\* cited by examiner

PISTON-INTEGRATED GAP COVER

The present disclosure is directed towards a piston seal ring and, more particularly, the present disclosure is directed towards a piston seal ring that includes features for engaging with a piston-integrated gap cover. This application claims the benefit of U.S. Provisional Patent Application No. 62/543,296 filed Aug. 9, 2017, the disclosure of which is hereby incorporated by reference herein in its entirety.

BACKGROUND

In some circumstances, it is desirable for a seal to function for as long as possible before needing replacement (e.g., have a long maintenance interval). For example, a typical target may be hundreds or thousands of hours of operation. Throughout these run-hours, the seal may wear down in the radial direction. To compensate for the radial wear, the seal may be split into one or more ring segments, allowing pressure to expand the ring segments outward and maintain sealing contact with the cylinder wall in spite of material removed via wear. For example, the total circumferential arc length of the resulting gaps between ring segments opens by $2*pi*\Delta R$, where $\Delta R$ is the radial wear of the seal. With a self-lubricating material being used for the seal, in which wear rates can be relatively high, the gap opens by an amount that results in an unacceptable leakage flow. This leakage limits the performance, and thus effective operating life, of the seal.

SUMMARY

In some embodiments, the present disclosure is directed to a piston assembly that includes a first ring, a second, and a piston. The first ring includes at least one first ring interface and an axially rearward surface. The second ring includes at least one second ring interface and at least two radially outside surfaces proximate to each second ring interface. The piston includes a ring groove in which the first ring is arranged axially in front of the second ring such that no first ring interface is azimuthally aligned with a second ring interface. The ring groove includes a rear land, and at least one gap-cover feature that extends axially forward from the rear land. The at least one gap cover feature includes an axially forward surface configured to engage the axially rearward surface of the first ring and a radially inward surface configured to engage the at least two radially outside surfaces of the second ring.

In some embodiments, as the second ring experiences wear, the at least one gap-cover feature substantially maintains contact with the at least two radially outside surfaces of the second ring, for at least part of a stroke of the piston assembly.

In some embodiments, the at least one gap-cover feature and the at least two radially outside surfaces of the second ring form a gas seal between a high-pressure region and a low-pressure region.

In some embodiments, the first ring includes an anti-rotation feature configured to prevent substantial azimuthal movement of the first ring in the ring groove.

In some embodiments, the piston is an open-faced piston.

In some embodiments, the piston assembly is configured for operation without liquid lubricant. For example, the piston assembly may be configured for oil-less operation.

In some embodiments, at least one of the first ring and the second ring includes a self-lubricating material. For example, in some embodiments, the self-lubricating materials includes graphite.

In some embodiments, the at least one gap-cover feature extends axially with a circle segment-shaped cross section having a boundary. The boundary includes a chord extending between two points on an outer radial surface of the piston. The distance between the two points is less than a diameter corresponding to the outer radial surface and an arc along the outer radial surface of the piston connecting the two points.

In some embodiments, the at least one gap cover feature is a contiguous material feature of the piston.

In some embodiments, the at least one gap cover feature is affixed to the ring groove.

In some embodiments, the piston assembly includes an insert arranged radially in between each of the at least two radially outside surfaces and the respective gap cover element. In some embodiments, the insert includes a self-lubricating material.

In some embodiments, the second ring has an axial thickness and the at least one gap cover element extends axially forward from the rear land for a distance equal to the axial thickness.

In some embodiments, the second ring is configured to seal against the rear land.

In some embodiments, the second ring includes an axially forward surface configured to seal against the axially rearward surface of the first ring.

In some embodiments, the second ring includes at least two second ring segments arranged with respective second ring interfaces between them, and at least two radially outside surfaces proximate to the respective second ring interfaces. The piston includes at least two gap-cover features that extending axially forward from the rear land. The at least two gap cover features each include an axially forward surface configured to engage the axially rearward surface of the first ring. The at least two gap cover features each also include a radially inward surface configured to engage the at least two radially outside surfaces (e.g., at the respective interface) of the second ring.

In some embodiments, the respective second ring interfaces are spaced evenly in the azimuthal direction. For example, two second ring interfaces may be spaced 180 degrees apart, while three second ring interfaces may be spaced 120 degrees apart, and so on.

In some embodiments, the at least one first ring interface is azimuthally arranged 90 degrees from a nearest second ring interface of the respective second ring interfaces.

In some embodiments, the present disclosure is directed to a device including a cylinder, a first ring, a second ring, and a piston. The cylinder includes a bore that has an axis. The first ring includes at least one first ring interface and an axially rearward surface. The second ring includes at least one second ring interface and at least two radially outside surfaces proximate to each second ring interface. The piston is configured to travel along the axis within the bore. The piston includes a ring groove in which the first ring is arranged axially in front of the second ring such that no first ring interface is azimuthally aligned with a second ring interface. The ring groove includes a rear land. The piston also includes at least one gap-cover feature that extends axially forward from the rear land. The at least one gap cover feature includes an axially forward surface configured to engage the axially rearward surface of the first ring and a radially inward surface configured to engage the at least two radially outside surfaces of the second ring.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure provides a geometry for eliminating gaps in a sealing ring assembly, even in the case of very large amounts of wear. Accordingly, the sealing ring assembly maintains low leakage and avoids increased stress, throughout the life of operation.

In some embodiments, a sealing ring assembly may include two ring-shaped elements, a front ring and a rear ring, arranged in a ring groove on a piston. The front and rear rings are both constructed, at least in part, of a solid-lubricant material such as, for example, graphite. In some embodiments, the front ring and the rear ring each include a single ring segment and one interface (e.g., a split in the radial direction). In some embodiments, the front ring and rear ring each include two interfaces (e.g., referred to herein as "radial splits, "splits," and "ring splits") arranged apart (e.g., approximately 180 degrees apart), dividing each respective ring into two ring segments which may be, but need not be, equal in size. In some embodiments, a front or rear ring may include more than two splits, but for purposes of discussion front and rear rings each having two splits will be described below. A ring split may allow the ends of ring segments (or ends of a single ring segment) to move radially outward to maintain contact, and thus a seal, with a bore of a cylinder as ring material is removed via wear. The ring segments are energized outward against the cylinder wall by gas pressure on the radially inner surface of the front and rear ring segments. As the ring segments wear and move radially outward, the ring splits between the ring segments open wider to form gaps which may allow large amounts of gas leakage if not covered. In some embodiments, the splits in the front ring are located offset relative to the splits in the rear ring (e.g., located approximately 90 degrees relative to the splits in the rear ring), such that the splits in the rear ring are covered by the front ring. Any suitable placement of the splits in a front ring relative to splits in a rear ring may be used in accordance with the present disclosure.

Gas pressure (e.g., from a high-pressure region) may be present on the inner surface of the rear ring and, in the absence of an additional gap cover, gas would flow radially through the splits in the rear ring and out the rear of the sealing ring assembly (e.g., to a low-pressure region). In order to address this potential leakage, a gap-cover feature is integrated as a part of, or attached to (e.g., via welding, brazing, pressing, bolts, or screws, or any combination thereof), the piston itself. A gap cover element may include sealing surfaces also that are not required to be parallel to the direction of motion (e.g., the ring segment between gap covers can itself have multiple segments that move in different directions). It only needs to be substantially non-perpendicular to motion of the ring segment. In an illustrative example, the rear ring segments have a flat section at each end, centered on each of the splits and symmetric about each split. In some embodiments, the flat section forms a plane roughly perpendicular to the plane of the split, and therefore parallel to the direction of motion of the ring segment, as material is removed due to wear. Corresponding gap-cover features protrude from the rear face of the piston groove (e.g., approximately 180 degrees apart in some embodiments) with the plane of the features on the piston oriented to align with the flat sections on the rear ring segments. When the rear ring segments are installed in the piston groove, the flat sections on the outside of the ring segments make approximately flat contact with the flat surfaces on the inward side of the piston gap-cover features. In some embodiments, the axial height of the protrusions in the ring groove matches the axial thickness of the rear ring segments. Therefore, with the front ring lying flat against the front face of the rear segments as arranged in the ring groove, the axial clearance between the front face of the gap-cover feature and the rear face of the front ring segment is minimal. Accordingly, during operation, gas leakage through the split in the rear ring is effectively blocked.

In addition to creating a seal at the flat faces, the piston gap-cover features support the outer surface of the rear ring segments against the pressure pushing the rear ring segments radially outward. One benefit may be that the ring is loaded in compression, thus avoiding tensile stresses and corresponding risk of breakage. This may be useful for materials that, for example, are susceptible to breakage or deformation under tensile loads (e.g., graphite or other ceramics). The gap-cover features are integrated as part of, or attached to, the piston, and are therefore, in some embodiments, constructed of a strong ductile material such as a metal, rather than the ring material. Further, the gap-cover features may be expected to not experience significant wear, and to thus maintain a constant geometry throughout the operational life. Under some circumstances, material may be removed from the ring's outer surface due to wear, and the ring segments move outward. By arranging the flat interface between the flat sections of the rear ring segments and the piston gap-cover features to be parallel to the direction of segment motion, the gap covering and sealing contact may be maintained throughout the extent of wear life.

The gap-cover features, whether flat or not, are rigidly attached to, or are part of, the piston when assembled (e.g., and do not move relative to the piston). In some embodiments, a gap-cover feature is a contiguous part of the piston such as, for example, a feature left over from machining, casting, or otherwise forming a ring groove into a piston billet. In some embodiments, a gap-cover feature is secured (i.e., affixed) to a piston using, for example, an adhesive, a weld (e.g., an ultrasonic weld, or a TiG weld), a braze joint, a fastener (e.g., via engaging mating threads), a pin (e.g., via press fitting), an interlocking interface, any other suitable securement, or any combination thereof. In an illustrative example, one or more gap-cover features may be retrofitted onto a piston of the prior art (e.g., along with any suitable modifications to a ring groove or piston face) in accordance with the present disclosure. In a further illustrative example, a piston may be created from one or more components, and one or more gap-cover features may be part of the one or more components, or components themselves.

The term "seal" as used herein, refers to the creation, maintenance, or both of a high-pressure region and a low-pressure region. For example, a seal may include a sealing ring assembly that is configured to reduce a leakage rate of gas from a high-pressure region to a low-pressure region, by limiting flow between a high-pressure boundary and a low-pressure boundary of the seal. Accordingly, a seal can be defined in terms of its constraints on a leakage rate. It will be understood that a seal, or sealing ring assembly, as described herein, may have any suitable corresponding leakage rate. For example, in some circumstances, a relatively worse seal may allow more leakage, but may be acceptable based on some performance criterion. In a further example, a sealing ring assembly configured for high efficiency operation of a piston and cylinder device may have a relatively low leakage rate (e.g., be a more effective seal).

As used herein, a "ring segment" shall refer to a sealing element extending for an azimuthal angle greater than zero degrees, having a radially outer surface, and configured to seal at least along a portion of the radially outer surface against a bore. A ring segment may include end faces, if not azimuthally contiguous around the full bore.

As used herein, a "ring" shall refer to a sealing element including at least one ring segment, which may be, but need not be, azimuthally contiguous along a bore. For example, a ring may include one ring segment, in which case these terms overlap. In a further example, a ring may include four ring segments, in which case the ring refers to the collective of the four ring segments. A ring may include, but need not include, one or more interfaces between one or more ring segments. A "ring" shall also refer to a sealing element including at least one ring segment configured to seal against a land of a piston.

As used herein, a "gap cover element" shall refer to a sealing element configured to seal against one or more ring segments at an interface, and to seal against at least a portion of a bore during wear of the one or more ring segments. While a gap cover element may function as a ring segment as the ring wears, for purposes of the discussion in the present disclosure, a gap cover element is not considered to be a ring segment for purposes of clarity.

As used herein, a "sealing ring assembly" shall refer to an assembly of one or more rings, and sometimes also one or more gap covers elements, configured to engage with a piston and configured to seal between a high-pressure region and a low-pressure region of a cylinder. For example, a single ring segment may be a ring and a sealing ring assembly. In a further example, several ring segments and corresponding gap covers may be a sealing ring assembly.

Figure 1:
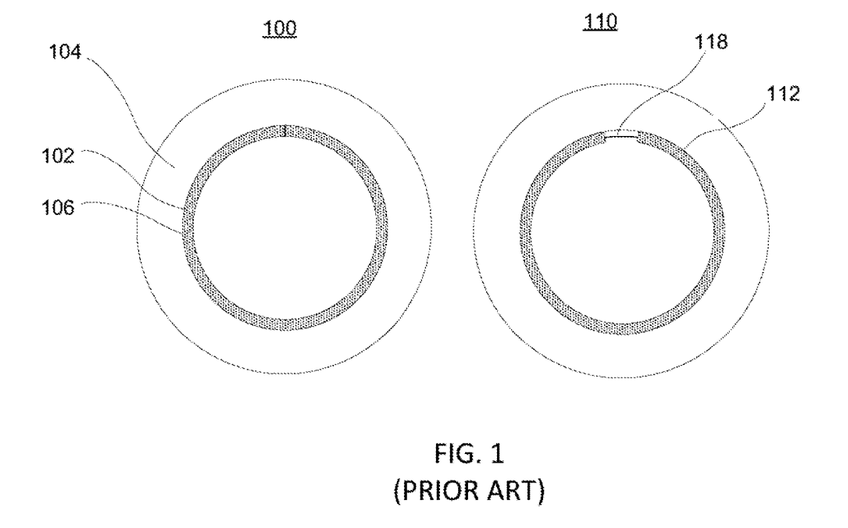
FIG. 1 shows a cross-sectional end view of a portion of an illustrative piston and cylinder assembly.

FIG. 1 shows a cross-sectional perspective view of a portion of an illustrative piston and cylinder assembly 100. Seal 102 is configured to seal between piston assembly 106 and cylinder 104, as piston assembly 106 moves axially in cylinder 104. After some amount of wear, as shown by cylinder assembly 110 of FIG. 1, seal 112 exhibits a significant gap 118, which may serve as a leak path.

Figure 2:
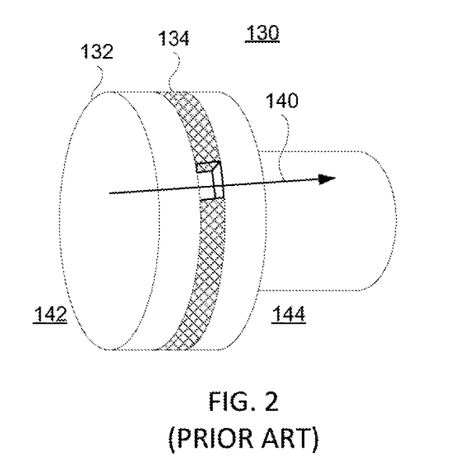
FIG. 2 shows a perspective view of a portion of an illustrative piston assembly.

FIG. 2 shows a perspective view of a portion of illustrative piston assembly 130. Shown in FIG. 2 is leak path 140 of relatively high-pressure gas 142 past worn seal 134, arranged on piston 132, to a region of relatively lower pressure 144.

Figure 3:
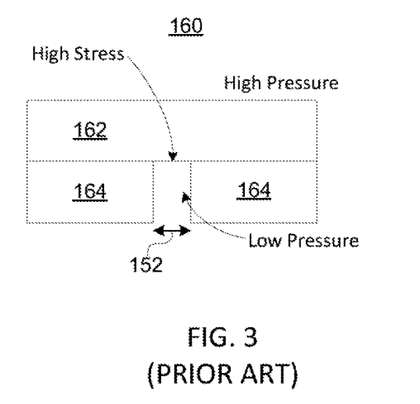
FIG. 3 shows a side view of a portion of an illustrative seal ring assembly.

FIG. 3 shows a side view of a two-ring seal 160, and gap 152 that has opened as seal 160 wears. Front ring segment 162 spans gap 152 in rear ring segment 164, and experiences high gas pressure (e.g., during the high-pressure portion of an engine cycle or air compression cycle) at one boundary, and low gas pressure (e.g., open to atmosphere or near atmospheric conditions or any pressure lower than the high-pressure region). The resulting stress from the pressure forces may increase as gap 152 increases, making ring segment 162 more susceptible to breakage. Ring breakage may result in further gaps being formed, or destruction of geometrical constraints, or both, which may result in high leakage of gas from, for example, a high-pressure region to a low-pressure region.

Figure 4:
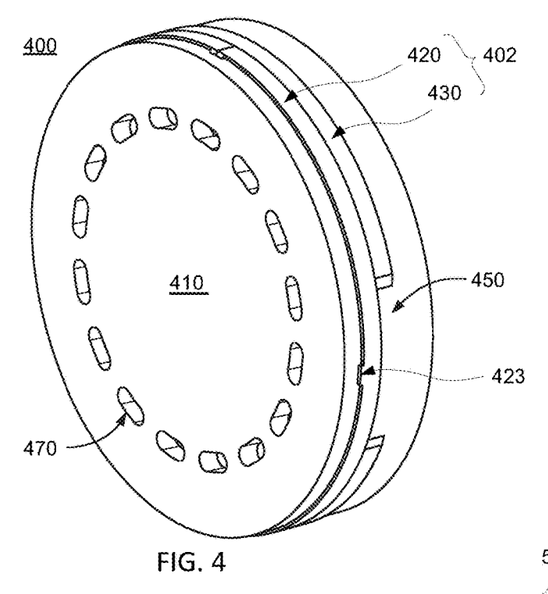
FIG. 4 shows a perspective view of a portion of an illustrative piston assembly, including a piston and a sealing ring assembly, in accordance with some embodiments of the present disclosure.
Figure 5:
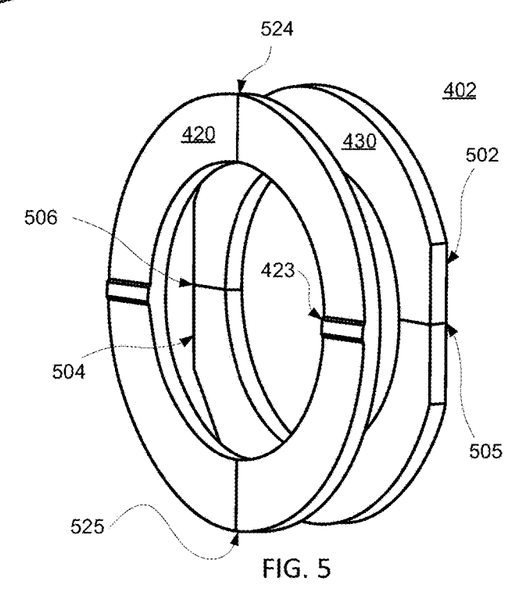
FIG. 5 shows an exploded perspective view of the illustrative sealing ring assembly of FIG. 4, in accordance with some embodiments of the present disclosure.

FIG. 4 shows a perspective view of a portion of illustrative piston assembly 400, including piston 410 and sealing ring assembly 402, in accordance with some embodiments of the present disclosure. FIG. 5 shows an exploded perspective view of illustrative sealing ring assembly 402, in accordance with some embodiments of the present disclosure. Piston 410, as shown illustratively in FIG. 4, for example, may include an open-faced piston (e.g., including openings 470). A sealing ring assembly may be arranged in a corresponding ring groove of any suitable piston type, in accordance with the present disclosure.

Sealing ring assembly 402 includes first ring 420 (e.g., a front ring) and second ring 430 (e.g., a rear ring). First ring 420 and second ring 430 may each include at least two respective ring segments, with corresponding interfaces between segments. For example, first ring 420 may include two first ring segments (e.g., two half ring-shaped segments), and two interfaces (i.e., interfaces 524 and 525 of FIG. 5) where the first ring segments meet. In a further example, second ring 430 may include two second ring segments (e.g., two half ring-shaped segments), and two interfaces (i.e., interfaces 505 and 506 of FIG. 5) where the second ring segments meet.

Piston 410 includes two gap cover features (i.e., gap-cover features 450 and 452, of which only gap-cover feature 450 is visible in FIG. 4), which may be configured to engage corresponding radially outside surfaces of second ring 430. Piston 410 includes a circumferential groove (i.e., a ring groove) in which first ring 420 and second ring 430 are arranged. In some embodiments, a piston may include more than one ring groove. First ring 420 is arranged axially in front of second ring 430 in the ring groove, such that no first interface is azimuthally aligned with a second interface. For example, first ring 420 may include two first ring segments and two first ring splits, and second ring 430 may include two second ring segments and two second ring splits, and first ring 420 and second ring 430 may be azimuthally staggered so that the splits are approximately 90° apart. While flat gap-cover feature 450 are shown in FIG. 4, any suitable shape of gap-cover features may be used in accordance with the present disclosure. For example, a gap-cover feature need not be flat, and may be suitably curved, angled, or a combination thereof. In a further example, a protrusion may, but need not, have the same shape as any other protrusion included in a piston. In an illustrative example, a gap cover feature may include 2 radially inward-facing surfaces at an angle to each other instead of one continuous flat surface. In some embodiments, the metal gap cover feature includes a pocket that is configured to hold one or more inserts (e.g., made from graphite or any other suitable material) that form the sealing surfaces. For example, the gap cover element may include a structural support for a graphite insert. In a further example, a piston-integrated gap cover feature may include a composite structure of metal and graphite.

In some embodiments, a piston may include at least two gap-cover features that each extend radially inward and axially into the circumferential groove. An axially outside surface of each of the at least two gap-cover features may contact an axially rear surface of first ring 420, and a radially inside surface of each of the at least two gap-cover features contacts a respective radially outside surface (e.g., a flat surface as illustrated) of second ring 430. Shown in FIG. 5 are radially outside surfaces 502 and 504 of second ring 430, which may contact corresponding gap-cover features of piston 410 during operation, during assembly, when assembled, or a combination thereof.

Although shown as extending azimuthally fully, or very nearly fully, 360 degrees, first ring 420 need not extend the full circumference. For example, a first ring may include ring segments extending azimuthally just sufficient to cover a split in the rear ring (e.g., a first ring may include ring segments with relatively large azimuthal gaps at the interfaces). As illustrated, first ring 420 includes anti-rotation feature 423 configured to prevent substantial azimuthal movement of first ring 420 in the ring groove.

Figure 6:
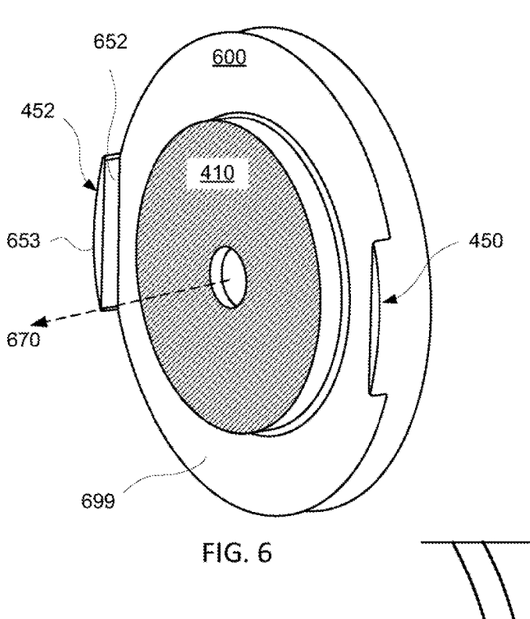
FIG. 6 shows a perspective view of a portion of the illustrative piston of FIG. 4, in accordance with some embodiments of the present disclosure.
Figure 7:
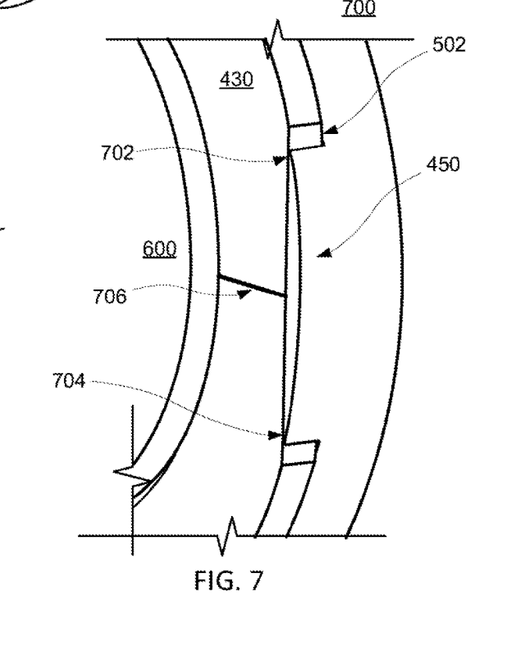
FIG. 7 shows a perspective view of a portion of the illustrative piston assembly of FIG. 4, including a gap-cover feature and second ring split, in accordance with some embodiments of the present disclosure.

FIG. 6 shows a perspective view of a portion 600 of piston 410 of FIG. 4, in accordance with some embodiments of the present disclosure. Gap-cover features 450 and 452 are more clearly visible without sealing ring assembly 402 in place. FIG. 7 shows a perspective view of portion 700 of illustrative piston assembly 400 of FIG. 4, including gap-cover feature 450 and second ring split 706 (i.e., an interface between second ring segments), in accordance with some embodiments of the present disclosure. Portion 700 includes some of portion 600 of FIG. 6. Gap-cover features 450 and 452 each extend axially, shown by the direction of axis 670 in FIG. 6. As shown illustratively in FIG. 7, gap-cover feature 450 (and likewise gap-cover feature 452) includes a circle segment-shaped cross section (e.g., in a plane for which axis 670 is normal). For example, the boundary of the circle segment-shaped cross section includes a chord extending between two points 702 and 704 on an outer radial surface of the piston (e.g., the distance between points 702 and 704 is less than a diameter corresponding to the outer radial surface), and an arc along the outer radial surface of piston 410 connecting points 702 and 704. A gap-cover feature may include any suitable cross-sectional shape, which may contact a section of a second ring, in accordance with the present disclosure.

Gap cover feature 452 includes radially inward surface 652 and axially forward surface 653. Radially inward surface 652 is configured to engage with and seal against radially outside surfaces of second ring 430. Second ring 430 is configured to seal against rear land 699 of piston 410. Axially forward surface 653 is configured to engage with and seal against an axially rearward face of first ring 420. For example, one gap-cover feature 452 extends axially forward from rear land 699 with a circle segment-shaped cross section having a boundary. The boundary includes a chord extending between two points on an outer radial surface of the piston. The distance between the two points is less than a diameter corresponding to the outer radial surface and an arc along the outer radial surface of the piston connecting the two points.

Figure 8:
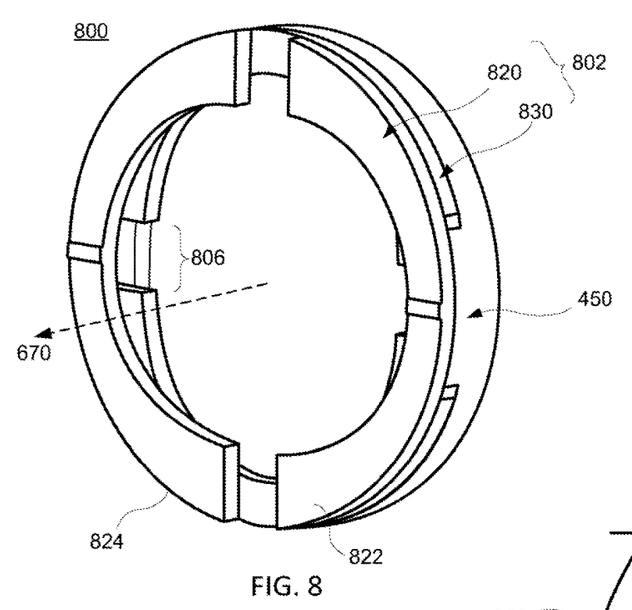
FIG. 8 shows a perspective view of a portion of the illustrative piston assembly of FIG. 4, after some wear, in accordance with some embodiments of the present disclosure.

FIG. 8 shows a perspective view of a portion 800 of illustrative piston assembly 400 of FIG. 4, after some wear, in accordance with some embodiments of the present disclosure. In the illustrative worn state shown by sealing ring assembly 802 in FIG. 8, as compared to an unworn state of sealing ring assembly 402 of FIGS. 4, 5, and 7, first ring 820 exhibits larger first ring gaps than first ring 420, and second ring 830 exhibits larger second ring gaps than second ring 430. For example, second ring split 806 includes a sizable gap after some wear. As shown in FIG. 8, gap cover feature 450 does not appreciably wear as sealing ring assembly 402 wears. For example, as sealing ring assembly 402 wears to match the shape illustrated by sealing ring assembly 802, the sealing interfaces with gap cover features 450 and 452 change accordingly.

Figure 9:
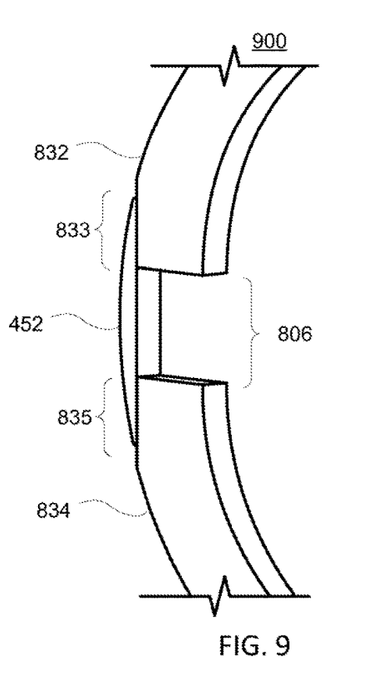
FIG. 9 shows a perspective view of a portion of the illustrative piston assembly of FIG. 4, including a gap-cover feature and second ring split after some wear, in accordance with some embodiments of the present disclosure.

FIG. 9 shows a perspective view of a portion 900 of illustrative piston assembly 800, including flat protrusion 452 and second ring split 806 after some wear, in accordance with some embodiments of the present disclosure. First ring segments are not shown in FIG. 9 to provide a clearer view of second ring split 806. Second ring segments 832 and 834 include respective flat sections 833 and 835, which may remain in contact with gap-cover feature 452. The arrangement of flat sections 833 and 835 with gap-cover feature 452 allows contact to be maintained as second ring segments 832 and 834 wear.

Gap-cover feature 452 extends radially inward (e.g., into the ring groove) and axially (i.e., in the direction of axis 670) into the ring groove. An axially forward surface of gap-cover feature 452 contacts an axially rear surface of first ring segment 824. For example, referencing piston 410, the contact area is substantially a circle segment. This contact area may form part of the seal between, for example, a high-pressure region and a low-pressure region. The seal may also include axial interfaces between first ring segments and second ring segments (e.g., between first ring segments 822 and 824 and second ring segments 832 and 834), and the interface(s) between second ring segments 832 and 834 with piston 410. For example, second ring segments 832 and 834 may interface with, and accordingly seal with, piston 410 at an axial interface (e.g., the rear axial face of the ring groove). In a further example, radially outer surfaces 833 and 835 (e.g., flat sections as illustrated) of respective second ring segments 832 and 834 may interface with corresponding gap-cover feature 452, and likewise, flat sections 831 and 837 interface with gap-cover feature 452.

In the context of FIGS. 4-9, for example, first ring 420 includes at least one first ring interface (e.g., interfaces 524 and 525) and an axially rearward surface. Second ring 430 includes at least one second ring interface (e.g., interfaces 505 and 506) and at least two radially outside surfaces proximate to each second ring interface (e.g., radially outside surfaces 502 of the two second ring segments at interface 505 and radially outside surfaces 504 of the two second ring segments at interface 506). Piston 410 includes a ring groove in which first ring 420 is arranged axially in front of second ring 430 such that interfaces 524 and 525 are not azimuthally aligned with interfaces 505 and 506. The ring groove includes rear land 699. Gap-cover features 450 and 452 extend axially forward from rear land 699. Gap-cover features 450 and 452 each include an axially forward surface (e.g., axially forward surface 653) configured to engage the axially rearward surface of first ring 420. Gap-cover features 450 and 452 each also include a radially inward surface (e.g., radially inward surface 652) configured to engage the at least two radially outside surfaces (e.g., radially outside surfaces 502) of second ring 430.

Figure 10:
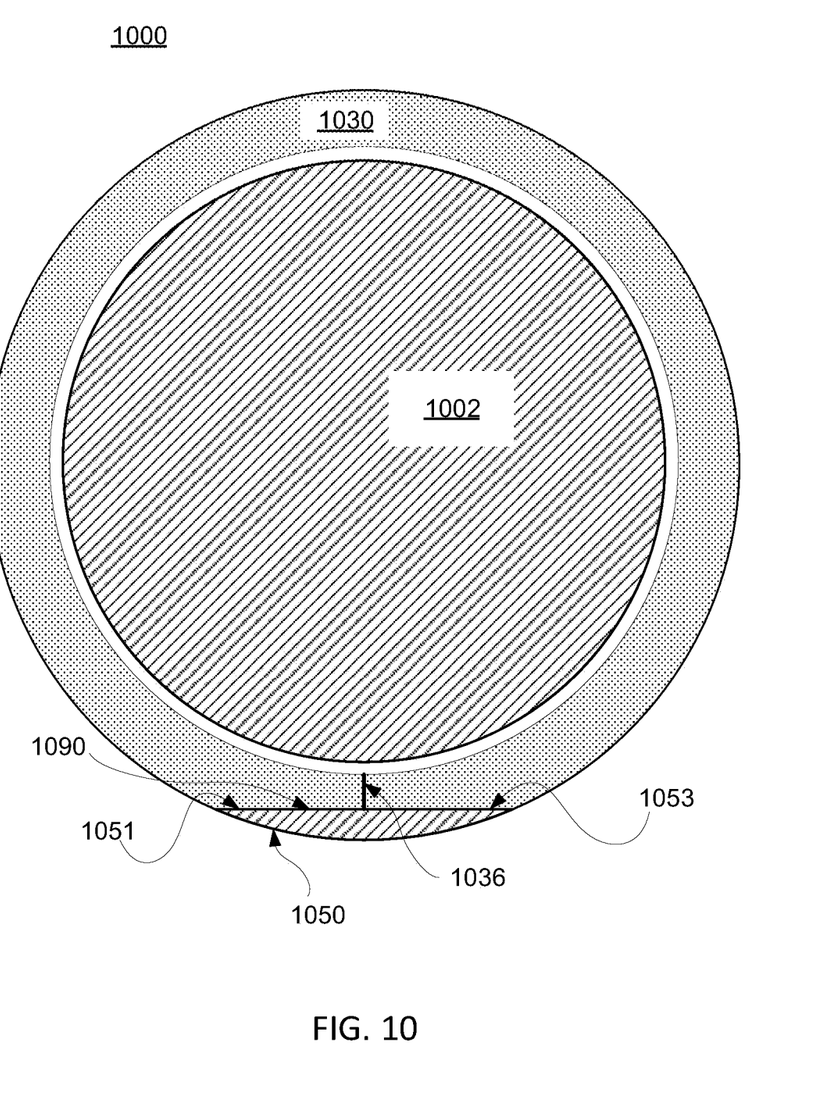
FIG. 10 shows a cross-sectional view of an illustrative piston assembly including a second ring having a single interface, in accordance with some embodiments of the present disclosure.

FIG. 10 shows a cross-sectional view of illustrative piston assembly 1000 including second ring 1030 having a single interface 1036, in accordance with some embodiments of the present disclosure. The view of FIG. 10 is a similar portion of a piston assembly as shown partially in FIG. 7. Although present for operation, no first ring is illustrated in FIG. 10, for clarity. Second ring 1030 includes a single ring segment, having single interface 1036. Interface 1036 is defined by the ends of ring 1030, and changes shape as second 1030 wears. Gap cover element 1050 is configured to interface to radially outside surfaces 1051 and 1053 of second ring 1030. As second ring 1030 wears (e.g., against a bore in a piston and cylinder device), gap cover element 1050 is configured to remain engaged with radially outer surfaces 1051 and 1053 (e.g., although the surface area of engagement may reduce with wear). Accordingly, as second ring 1030 wears, interface 1036 may widen azimuthally. Although not shown in FIG. 10, the first ring may also include a single interface, which may be azimuthally offset from interface 1036 (e.g., 90 degrees, 180 degrees, or any other suitable offset). In some embodiments, piston assembly 1000 includes insert 1090 arranged radially in between each of the at least two radially outside surfaces 1051 and 1053 and the respective gap cover element 1050. In some embodiments, insert 1090 includes a self-lubricating material.

Figure 11:
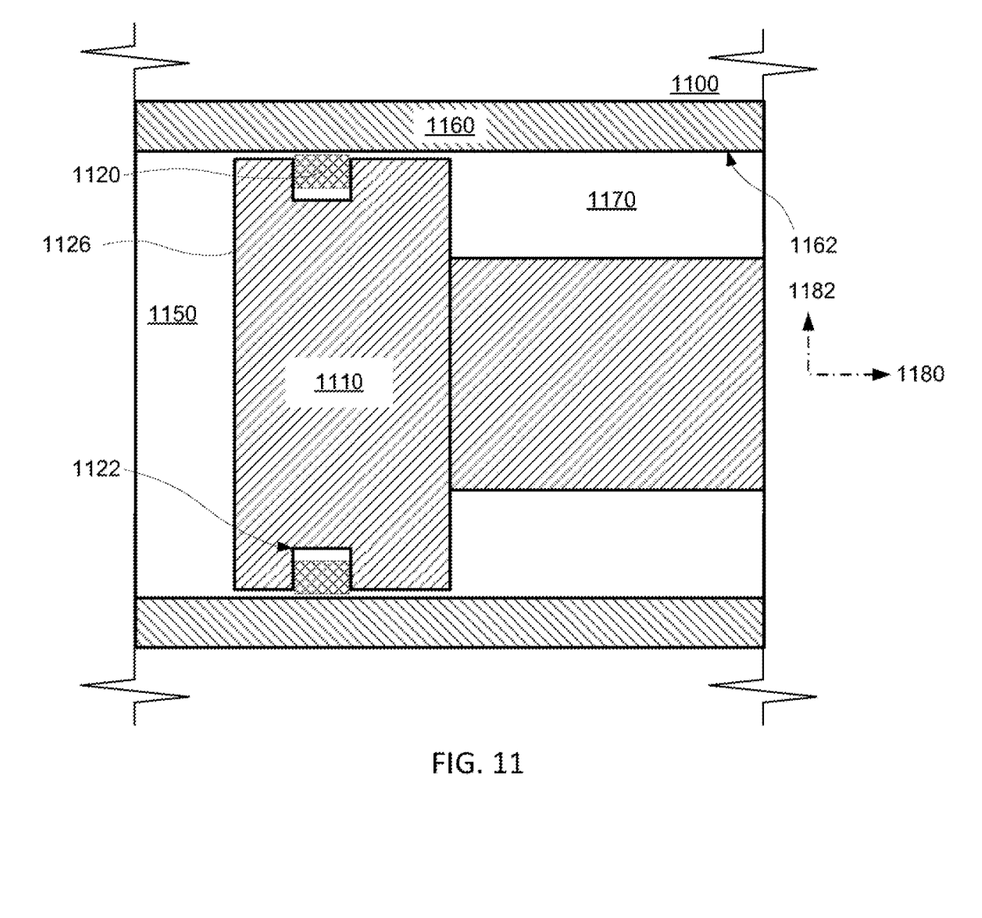
FIG. 11 shows a perspective view of a portion of an illustrative piston and cylinder assembly, in accordance with some embodiments of the present disclosure.

FIG. 11 shows a perspective view of a portion of illustrative piston and cylinder assembly 1100, including sealing ring assembly 1120, in accordance with some embodiments of the present disclosure. Cylinder 1160 may include bore 1162, which is the inner cylindrical surface in which piston assembly 1110 travels (e.g., along axis 1180). Piston assembly 1110 may include piston 1126, which includes a ring groove 1122, in which sealing ring assembly 1120 is configured to ride. As piston assembly 1110 translates along axis 1180 (e.g., during an engine cycle), in cylinder 1160, the gas pressure in high-pressure region 1150 may change (e.g., high-pressure region 1150 may be closed with a cylinder head or an opposing piston). For example, as piston assembly 1110 moves to the left in FIG. 11 (opposite the direction of axis 1180), the pressure in high pressure region 1150 may increase. Low-pressure region 1170, located to the rear of sealing ring assembly 1120, may include gas at a pressure below the pressure of high-pressure region 1150 for at least some, if not most, of a stroke or cycle of the piston and cylinder assembly. The pressure ranges in high-pressure region 1150 and low-pressure region 1170 may be any suitable ranges (e.g., sub-atmospheric pressure to well over 250 bar), and may depend on compression ratio, engine breathing details (e.g., boost pressure, pressure waves, breathing timing), losses, thermochemical properties of gases, and reaction thereof. Accordingly, the sealing ring assemblies described herein may be used to seal any suitable high-pressure region and low-pressure region, having any suitable pressure ranges. For example, in some embodiments, low pressure region 1170 may interact flow-wise with intake or exhaust ducting and be maintained relatively near pressure in the ducting. In an illustrative example, low-pressure region 1170 may open to intake breathing ports, and may be at a pressure near to or strongly affected by (e.g., on average) an intake pressure (e.g., a boost pressure). In a further illustrative example, low-pressure region 1170 may open to exhaust breathing ports, and may be at a pressure near to or strongly affected by (e.g., on average) an exhaust pressure. In accordance with the present disclosure, sealing ring assemblies may be used to seal high pressure regions from low-pressure regions for at least part of a stroke or cycle. It will be understood the front of a sealing ring assembly refers to the face axially nearest high-pressure region 1150, and the rear of a sealing ring assembly refers to the face axially nearest low-pressure region 1170. In some embodiments, the regions of high pressure and low pressure may switch, and the sealing ring assembly may continue to seal the high-pressure region from the low-pressure region. In some embodiments, the regions of high pressure and low pressure may switch, and the sealing ring assembly may not continue to seal the high-pressure region from the low-pressure region.

It will be understood that unless otherwise specified, all pressures referred to herein are in absolute units (e.g., not gage or relative).

It will be understood that high-pressure and low-pressure may refer to transient pressure states of a piston and cylinder device. For example, referencing an engine cycle, the high-pressure side of a sealing ring assembly may have a pressure greater than a low-pressure side of the sealing ring assembly for most of the engine cycle (e.g., except possibly during breathing or near-breathing portions of the cycle). Accordingly, high-pressure and low-pressure are relative and depend on the conditions of the gas being sealed. A sealing ring assembly may be used to seal a high pressure and a low-pressure region, each operating in any suitable pressure range. It will also be understood that a sealing ring assembly may seal differently at different positions in a cycle. For example, a sealing ring assembly may always seal a high-pressure region from a low-pressure region. In a further example, a sealing ring assembly may seal a high-pressure region from a low-pressure region as long as the pressure in the high-pressure region is greater than the pressure in the low-pressure region. In a further example, a sealing ring assembly may seal a high-pressure region from a low-pressure region as long as the pressure in the high-pressure region is greater than the pressure in the low-pressure region, and conversely, seal a low-pressure region from a high-pressure region as long as the pressure in the low-pressure region is greater than the pressure in the high-pressure region.

In some embodiments, sealing ring assembly 1120 may deposit material on bore 1162 of cylinder 1160. Deposited material may lubricate the bore-to-sealing ring assembly interface between bore 1162 and sealing ring assembly 1120 (e.g., provide a dry lubricant). Accordingly, in some embodiments, piston and cylinder assembly 1100 may operate without oil for lubrication.

In some embodiments, piston 1126 may be an open-faced piston. For example, piston 1126 may include openings, cutouts, or other fluid paths from high pressure region 1150 to ring groove 1122. Accordingly, in some embodiments employing an open-faced piston, the inner radial surfaces (e.g., referencing axis 1182 which defines the radial direction in FIG. 11) of sealing ring assembly 1120 may be exposed to gas pressure of high pressure region 1150.

Figure 12:
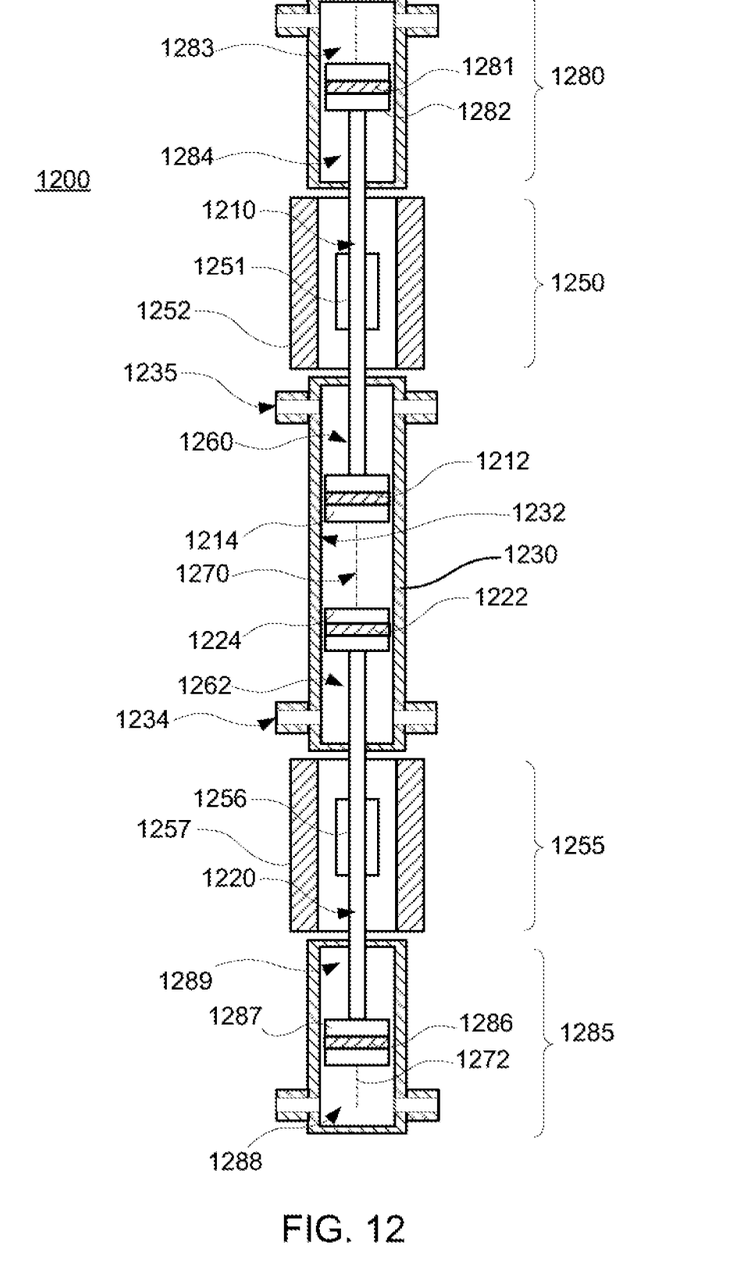
FIG. 12 shows a cross-sectional view of an illustrative device, including a piston and cylinder assembly, in accordance with some embodiments of the present disclosure.

FIG. 12 shows a cross-sectional view of illustrative device 1200 including two free piston assemblies 1210 and 1220 that include respective sealing ring assemblies 1212 and 1222, in accordance with some embodiments of the present disclosure. In some embodiments, device 1200 may include linear electromagnetic machines 1250 and 1255 to convert between kinetic energy of respective free piston assemblies 1210 and 1220 and electrical energy. In some embodiments, device 1200 may include gas regions 1260 and 1262, which may, for example, be at a relatively lower pressure than gas region 1270 (e.g., a high-pressure region) for at least some, if not most, of a cycle (e.g., an engine cycle, or an air compression cycle). For example, gas regions 1260 and 1262 (e.g., low pressure regions) may be open to respective breathing ducting (e.g., an intake manifold, an intake system, an exhaust manifold, an exhaust system). To illustrate, breathing ports 1234 and 1235 are configured to provide reactants to, and remove exhaust from, bore 1232 of cylinder 1230. In a further example, gas regions 1260 and 1262 may be vented to atmosphere (e.g., be at about 1.01 bar absolute pressure). In some embodiments, device 1200 may include gas springs 1280 and 1285, which may be used to store and release energy during a cycle in the form of compressed gas (e.g., a driver section). For example, free piston assemblies 1210 and 1220 may each include respective pistons 1282 and 1287, having grooves for respective sealing ring assemblies 1281 and 1286, to seal respective gas regions 1283 and 1288 (e.g., high-pressure regions) from respective gas regions 1284 and 1289 (e.g., low-pressure regions).

Cylinder 1230 may include bore 1232, centered about axis 1272. In some embodiments, free piston assemblies 1210 and 1220 may translate along axis 1272, within bore 1232, allowing gas region 1270 to compress and expand. For example, gas region 1270 may be at relatively high pressure as compared to gas region 1260 for at least some of a stroke of free piston assemblies 1210 and 1220 (e.g., which may translate along axis 1272 in opposed piston synchronization). Sealing ring assemblies 1212 and 1222 may seal gas region 1270 from respective gas regions 1260 and 1262 within bore 1232. In some embodiments, free piston assemblies 1210 and 1220 may include respective pistons 1214 and 1224, and respective sealing ring assemblies 1212 and 1222 which may be arranged in respective corresponding grooves of pistons 1214 and 1224. It will be understood that gas regions 1260 and 1262, and gas region 1270, may change volume as free piston assemblies 1210 and 1220 move or are otherwise positioned at different locations along axis 1272. The portions of respective sealing ring assemblies 1212 and 1222 nearest gas region 1270 are each termed the front, and the portion of sealing ring assemblies 1212 and 1222 nearest respective gas regions 1260 and 1262 are each termed the rear. Sealing ring assemblies 1212 and 1222 may each include a high-pressure boundary, which may each depend on a pressure in gas region 1270. For example, a high-pressure boundary of sealing ring assembly 1212 may be open to gas region 1270 (e.g., coupled by one or more orifices, or other opening), and have a corresponding pressure the same as (e.g., if gas from gas region 1270 is unthrottled in the sealing ring assembly), or less than (e.g., if gas from gas region 1270 is throttled in the sealing ring assembly), the pressure of gas region 1270. Sealing ring assemblies 1212 and 1222 may each include a low-pressure boundary, which may depend on a gas pressure in respective gas regions 1260 and 1262. For example, a low-pressure boundary of sealing ring assembly 1212 may be open to gas region 1260, and have a corresponding pressure about the same as the pressure of gas region 1260.

In some embodiments, pistons 1214 and 1224 may each include one or more grooves into which one or more respective sealing ring assemblies may be arranged. For example, as shown in FIG. 12, pistons 1214 and 1224 may each include one groove, into which sealing ring assembly 1212 and sealing ring assembly 1222 may be installed, respectively. In a further example, although not shown in FIG. 12, piston 1214 may include two grooves, in which two respective components of sealing ring assembly 1212 may be installed. A sealing ring assembly may be used to seal any suitable high pressure and low-pressure regions from each other. For example, sealing ring assembly 1286 is configured to seal high-pressure region 1288 (e.g., a gas spring) from low-pressure region 1289. In a further example, sealing ring assembly 1281 is configured to seal high-pressure region 1283 (e.g., a gas spring) from low-pressure region 1284.

In some embodiments, free piston assemblies 1210 and 1220 may include respective magnet sections 1251 and 1256, which interact with respective stators 1252 and 1257 to form respective linear electromagnetic machines 1250 and 1255. For example, as free piston assembly 1210 translates along axis 1272 (e.g., during a stroke of an engine cycle), magnet section 1251 may induce current in windings of stator 1252. Further, current may be supplied to respective phase windings of stator 1252 to generate an electromagnetic force on free piston assembly 1210 (e.g., to effect motion of free piston assembly 1210).

In some embodiments, pistons 1214 and 1224, sealing ring assemblies 1212 and 1222, and cylinder 1230 may be considered a piston and cylinder assembly. In some embodiments, device 1200 may be an engine, an air compressor, any other suitable device having a piston and cylinder assembly, or any combination thereof. In some embodiments, device 1200 need not include two free piston assemblies. For example, cylinder 1230 could be closed (e.g., with a cylinder head), and free piston assembly 1210 alone may translate along axis 1272.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion, reaction, and heat devices such as a reciprocating engine and a free-piston engine. In some embodiments, the present disclosure is applicable to non-combustion and non-reaction devices such as reciprocating compressors and free-piston compressors. In some embodiments, the present disclosure is applicable to gas springs. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, spark ignition, or both. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A piston assembly comprising:
    a first ring comprising at least one first ring interface and an axially rearward surface;
    a second ring comprising:
        at least one second ring interface, and
        at least two radially outside surfaces proximate to each second ring interface; and
    a piston comprising:
        a ring groove in which the first ring is arranged axially in front of the second ring such that no first ring interface is azimuthally aligned with a second ring interface, wherein the ring groove comprises a rear land, and
        at least one gap-cover feature that extends axially forward from the rear land, wherein the at least one gap cover feature comprises:
            an axially forward surface configured to engage the axially rearward surface of the first ring, and
            a radially inward surface configured to engage the at least two radially outside surfaces of the second ring.

2. The piston assembly of claim 1, wherein as the second ring experiences wear, the at least one gap-cover feature substantially maintains contact with the at least two radially outside surfaces of the second ring, for at least part of a stroke of the piston assembly.

3. The piston assembly of claim 1, wherein the at least one gap-cover feature and the at least two radially outside surfaces of the second ring form a gas seal between a high-pressure region and a low-pressure region.

4. The piston assembly of claim 1, wherein the first ring comprises an anti-rotation feature configured to prevent substantial azimuthal movement of the first ring in the ring groove.

5. The piston assembly of claim 1, wherein the piston is an open-faced piston.

6. The piston assembly of claim 1, configured for operation without liquid lubricant.

7. The piston assembly of claim 1, wherein at least one of the first ring and the second ring is comprised of a self-lubricating material.

8. The piston assembly of claim 7, wherein the self-lubricating material comprises graphite.

9. The piston assembly of claim 1, wherein the at least one gap-cover feature extends axially with a circle segment-shaped cross section having a boundary, the boundary comprising:
    a chord extending between two points on an outer radial surface of the piston, wherein the distance between the two points is less than a diameter corresponding to the outer radial surface; and
    an arc along the outer radial surface of the piston connecting the two points.

10. The piston assembly of claim 1, wherein the at least one gap cover feature is a contiguous material feature of the piston.

11. The piston assembly of claim 1, wherein the at least one gap cover feature is affixed to the piston.

12. The piston assembly of claim 1, further comprising an insert arranged radially in between each of the at least two radially outside surfaces and the at least one gap cover feature, wherein the insert comprises a self-lubricating material.

13. The piston assembly of claim 1, wherein the second ring comprises an axial thickness, and wherein the at least one gap cover feature extends axially forward from the rear land for a distance substantially equal to the axial thickness.

14. The piston assembly of claim 1, wherein the second ring is configured to seal against the rear land.

15. The piston assembly of claim 1, wherein the second ring comprises an axially forward surface configured to seal against the axially rearward surface of the first ring.

16. The piston assembly of claim 1, wherein the at least one second ring interface comprises two or more second ring interfaces spaced substantially equally apart in the azimuthal direction.

17. The piston assembly of claim 1, wherein the at least one first ring interface is azimuthally arranged substantially 90 degrees from a nearest second ring interface of the at least one second ring interface.

18. A device comprising:
    a cylinder comprising a bore having an axis;
    a first ring comprising at least one first ring interface and an axially rearward surface;
    a second ring comprising:
        at least one second ring interface, and
        at least two radially outside surfaces proximate to each second ring interface; and
    a piston configured to travel along the axis within the bore, the piston comprising:
        a ring groove in which the first ring is arranged axially in front of the second ring such that no first ring interface is azimuthally aligned with a second ring interface, wherein the ring groove comprises a rear land, and
        at least one gap-cover feature that extending axially forward from the rear land, wherein the at least one gap cover feature comprises:
            an axially forward surface configured to engage the axially rearward surface of the first ring, and
            a radially inward surface configured to engage the at least two radially outside surfaces of the second ring.

19. The device of claim 18, wherein as the second ring experiences wear, the at least one gap-cover feature substantially maintains contact with the at least two radially outside surfaces of the second ring, for at least part of a stroke of the piston assembly.

20. The device of claim 18, wherein the at least one gap cover element and the at least two radially outside surfaces of the second ring form a gas seal between a high-pressure region and a low-pressure region.

21. The device of claim 18, wherein the first ring comprises an anti-rotation feature configured to prevent substantial azimuthal movement of the first ring in the ring groove.

22. The device of claim 18, wherein the piston is an open-faced piston.

23. The device of claim 18, configured for operation without liquid lubricant.

24. The device of claim 18, wherein at least one of the first ring and the second ring is comprised of a self-lubricating material.

25. The device of claim 24, wherein the self-lubricating material comprises graphite.

26. The device of claim 18, wherein the at least one gap-cover feature extends axially with a circle segment-shaped cross section having a boundary, the boundary comprising:

a chord extending between two points on an outer radial surface of the piston, wherein the distance between the two points is less than a diameter corresponding to the outer radial surface; and an arc along the outer radial surface of the piston connecting the two points.

27. The device of claim 18, wherein the at least one gap cover feature is a contiguous material feature of the piston.

28. The device of claim 18, wherein the at least one gap cover feature is affixed to the piston.

29. The device of claim 18, further comprising an insert arranged radially in between each of the at least two radially outside surfaces and the at least one gap cover feature, wherein the insert comprises a self-lubricating material.

30. The device of claim 18, wherein the second ring comprises an axially forward surface configured to seal against the axially rearward surface of the first ring.

* * * * *